United States Patent
Kang et al.

(10) Patent No.: US 8,184,753 B2
(45) Date of Patent: May 22, 2012

(54) APPARATUS AND METHOD FOR OFDM CHANNEL EQUALIZATION

(75) Inventors: Jin Yong Kang, Gyunggi-do (KR); Hyung Jin Choi, Seoul (KR); Se Bin Im, Gyunggi-do (KR); Kyung Doc Jang, Chungcheongnam-do (KR)

(73) Assignees: Samsung Electro-Mechanics Co., Ltd., Gyunggi-do (KR); Sungkyunkwan University Foundation for Corporate Collaboration, Gyunggi-do (KR)

( * ) Notice: Subject to any disclaimer, the term of this patent is extended or adjusted under 35 U.S.C. 154(b) by 522 days.

(21) Appl. No.: 12/492,488

(22) Filed: Jun. 26, 2009

(65) Prior Publication Data
US 2010/0158094 A1 Jun. 24, 2010

(30) Foreign Application Priority Data
Dec. 22, 2008 (KR) .................. 10-2008-0130901

(51) Int. Cl.
*H04B 1/10* (2006.01)
(52) U.S. Cl. ........ 375/350; 375/148; 375/229; 375/285; 455/501; 455/63.1
(58) Field of Classification Search .................. 375/141, 375/144, 148, 229, 230, 232, 260, 267, 285, 375/346, 347, 349, 350; 455/501, 63.1, 67.11, 455/67.13, 226.1; 370/319, 321, 344, 464, 370/478
See application file for complete search history.

(56) References Cited

U.S. PATENT DOCUMENTS

| | | | |
|---|---|---|---|
| 7,327,800 B2 * | 2/2008 | Oprea et al. .................. | 375/267 |
| 7,421,020 B2 | 9/2008 | Kang et al. | |
| 7,440,490 B2 * | 10/2008 | Kidiyarova-Shevchenko et al. .............................. | 375/148 |
| 2006/0285531 A1 * | 12/2006 | Howard et al. ............... | 370/343 |
| 2009/0143017 A1 * | 6/2009 | Barak et al. ..................... | 455/65 |

* cited by examiner

*Primary Examiner* — Dac Ha
(74) *Attorney, Agent, or Firm* — Lowe Hauptman Ham & Berner, LLP

(57) ABSTRACT

An apparatus and method for orthogonal frequency division multiplexing (OFDM) channel equalization are disclosed. The apparatus includes a compensation value setting unit setting a compensation value in the form of a diagonal matrix by use of a diagonal matrix of diagonal elements extracted from a channel matrix of an OFDM receiver, and a preset divergence suppression value, an initial estimation value calculation unit calculating an initial estimate value by use of a fast Fourier transform (FFT)-processed signal of the OFDM receiver and the compensation value, an equalization unit detecting a transmission signal to be processed by use of the compensation value, the channel matrix and the diagonal matrix, and a symbol decision unit determining a symbol for an adjacent signal of a transmission signal, which is to be processed among a plurality of signals output from the equalization unit, and providing the symbol-determined adjacent signal to the equalization unit.

12 Claims, 8 Drawing Sheets

APPARATUS AND METHOD FOR OFDM CHANNEL EQUALIZATION

CROSS-REFERENCE TO RELATED APPLICATIONS

This application claims the priority of Korean Patent Application No. 2008-0130901 filed on Dec. 22, 2008, in the Korean Intellectual Property Office, the disclosure of which is incorporated herein by reference.

BACKGROUND OF THE INVENTION

1. Field of the Invention

The present invention relates to an apparatus and method for orthogonal frequency division multiplexing (OFDM) channel equalization applicable to an OFDM system, and more particularly, to an apparatus and method for OFDM channel equalization, which can prevent divergence, increase a convergence rate, and enhance mean square error (MSE) performance in an equalization scheme using Jacobi iteration applied to an OFDM system in fast time-varying fading channel environments.

2. Description of the Related Art

In fast time-varying fading channel environments, the impulse response of a channel may vary even within one symbol of an orthogonal frequency division multiplexing (OFDM) signal. Thus, interference between sub-carriers in a frequency domain after a fast Fourier transform (FFT), may destroy the orthogonality between the sub-carriers. This phenomenon is called inter carrier interference (ICI).

ICI is caused by adjacent sub-carriers in most cases, and results in serious errors in the processes of channel estimation and compensation. For this reason, a simple single-tap equalization scheme has limitations in enhancing bit error rate (BER) performance.

Thus, considering the rate of channel variations over time in high-mobility environments, equalizers need to be designed with regard to the influences on channels of adjacent sub-carrier symbols, as well as sub-carrier symbols of a corresponding frequency domain.

If the FFT size of an OFDM system is designated as N, a frequency-domain equalization scheme for high-mobility environments is configured so as to obtain the solution of a system of equations with respect to an N×N channel matrix.

However, this scheme of obtaining the solution of a system of equations of the full tap results in excessive complexity. Therefore, the solution of the system of equations may be obtained after a band matrix having a size smaller than N×N is formed.

However, the equalization scheme using the band matrix has a limited performance since the impulse response of a channel exceeds the size of the band matrix in high mobility environments.

To overcome the aforementioned limitations, an equalization scheme using Jacobi iteration (hereinafter, also referred to as Jacobi iteration equalization scheme), one type of iteration scheme using a full matrix, is adopted for the equalization of OFDM systems in fast time-varying fading channel environments. Here, the Jacobi iteration equalization scheme may achieve a significant reduction in the complexity of an inverse matrix.

The Jacobi iteration equalization scheme used for the channel equalization of OFDM systems will now be briefly described.

A transmission signal (x[n]) of an OFDM system may be represented by Equation 1 below:

$$x[n] = \frac{1}{N}\sum_{k=0}^{N-1} X[k]e^{j2\pi kn/N} \quad (1)$$

where N denotes the size of an FFT, x[n] denotes a transmission signal, X[k] denotes a tap location in a plurality of FFT-processed transmission signals, and $e^{j2\pi kn/N}$ denotes the phase component of the transmission signal.

A time-domain reception signal, excluding noise, in multipath environments may be represented by Equation 2 below, a signal, after the FFT processing of an OFDM receiver, may be represented by Equation 3 below, and this signal may also be represented in the form of a matrix as shown in Equation 4:

$$y[n] = \sum_{l=0}^{L-1} h_{l,m}[n]x_m[n-1] \quad (2)$$

$$y_m[k] = F\{y_m[n]\} = \frac{1}{N}\sum_{l=0}^{L-1}\left(\sum_{p=0}^{L-1} X_m[p]H_{l,m}[(k-p)_N]\right)e^{-j2\pi pT_1/N} \quad (3)$$

$$\begin{bmatrix} Y[0] \\ Y[1] \\ Y[2] \\ \vdots \\ Y[N-3] \\ Y[N-2] \\ Y[N-1] \end{bmatrix} = \quad (4)$$

$$\begin{bmatrix} a_{0,0} & a_{0,1} & 0 & 0 & \cdots & 0 & a_{0,N-1} \\ a_{1,0} & a_{1,1} & a_{0,1} & 0 & 0 & & 0 \\ 0 & a_{2,1} & a_{2,2} & a_{2,3} & 0 & \ddots & 0 \\ \vdots & \vdots & \vdots & \vdots & & \ddots & \vdots \\ & & & & \ddots & & \\ 0 & & 0 & 0 & a_{N-2,N-3} & a_{N-2,N-3} & a_{N=2,N-1} \\ a_{N-1,0} & 0 & \cdots & 0 & 0 & 0 & a_{N-1,N-1} \end{bmatrix} =$$

$$\begin{bmatrix} X[0] \\ X[1] \\ X[2] \\ \vdots \\ X[N-3] \\ X[N-2] \\ X[N-1] \end{bmatrix}$$

In Equation 4 above, $a_{k,p}$ may be represented by Equation 5 below:

$$a_{k,p} = \frac{1}{N}\sum_{l=0}^{L-1} H_{l,m}[(k-p)_N]e^{-j2\pi pT_1/N} \quad (5)$$

In Equation 5, a channel matrix $H_{l,m}[(k-p)_N]$ is equal to $F\{h_{l,m}[n]\}$, and namely, $H_{l,m}[(k-p)_N]=F\{h_{l,m}[n]\}$. K denotes the row of a channel matrix, and p denotes the column of the channel matrix.

FIG. 1 is a graph depicting the power of a channel matrix in OFDM channel equalization.

Referring to FIG. 1 and Equation 4, it can be seen that the power of a channel matrix 'H' is in the form in which relatively greater values are distributed at a diagonal portion. The Jacobi iteration scheme may be used in the equalization of an OFDM system, which uses this channel matrix configuration.

The channel matrix 'H' may include a diagonal matrix 'D' and an off-diagonal matrix 'H−D' as represented by Equation 6 below:

$$D = \begin{bmatrix} a_{0,0} & 0 & \cdots & 0 \\ 0 & a_{1,1} & \cdots & 0 \\ \vdots & \vdots & \ddots & \vdots \\ 0 & 0 & \cdots & a_{N-1,N-1} \end{bmatrix},$$

$$H - D = \begin{bmatrix} 0 & u_{0,1} & \cdots & u_{0,N-1} \\ \ell_{1,0} & 0 & \cdots & u_{1,N-1} \\ \vdots & \vdots & \ddots & \vdots \\ \ell_{N-1,0} & \ell_{N-1,1} & \cdots & 0 \end{bmatrix}$$

(6)

The Jacobi iteration equalization scheme using Equation 4 and Equation 6 may be represented by Equation 7 below:

$$X^{(r)} = X^{(o)} - M \cdot X^{(r-1)}, \quad M = D^{-1}(H-D) \quad (7)$$

where r=1, 2, 3, ..., which denotes the number of iterations, $X^{(0)}$ denotes an initial estimate value, which is represented by Equation 8 below, M denotes an interference cancellation matrix, D denotes a diagonal matrix, and H denotes a channel matrix.

$$X^{(0)} = \left( \frac{Y[0]}{a_{0,0}}, \frac{Y[1]}{a_{1,1}}, \frac{Y[2]}{a_{2,2}} \cdots, \frac{Y[N-1]}{a_{N-1,N-1}} \right)^T \quad (8)$$

However, the related art OFDM channel equalization has the following limitations, and these will now be described with reference to FIG. 2.

FIG. 2 is a graph depicting mean square error (MSE) performance by the related art method for OFDM channel equalization. FIG. 2 shows the result of a simulation on the related art Jacobi iteration equalization scheme in the environment where a normalized Doppler frequency (fd) is '0.1'. It can be seen from FIG. 2 that if $a_{0,0}, a_{1,1}, \ldots, a_{N-1}$ and $a_{N-1,N-1}$, which are the denominators of Equation 8, approach zero, the initial estimate value ($X^{(0)}$) diverges. In this case, channel equalization cannot be performed normally.

SUMMARY OF THE INVENTION

An aspect of the present invention provides an apparatus and method for OFDM channel equalization, which can prevent divergence, increase a convergence rate, and enhance mean square error (MSE) performance in a Jacobi iteration equalization scheme applied to an OFDM system in fast time-varying fading channel environments.

According to an aspect of the present invention, there is provided an apparatus for orthogonal frequency division multiplexing (OFDM) channel equalization, including: a compensation value setting unit setting a compensation value in the form of a diagonal matrix by using a diagonal matrix of diagonal elements extracted from a channel matrix of an OFDM receiver, and a preset divergence suppression value to suppress divergence caused by Jacobi iteration in the channel equalization of the OFDM receiver; an initial estimate value calculation unit calculating an initial estimate value by using a fast Fourier transform (FFT)-processed signal of the OFDM receiver and the compensation value from the compensation value setting unit; an equalization unit obtaining an interference trigger value by using the compensation value from the compensation value setting unit, the channel matrix and the diagonal matrix, multiplying the interference trigger value by a symbol-determined pre-equalized signal to obtain an interference cancellation compensation value, and subtracting the interference cancellation compensation value from the initial estimate value to detect a transmission signal to be processed; and a symbol decision unit determining a symbol for an adjacent signal of a transmission signal, which is to be processed among a plurality of signals output from the equalization unit, and providing the symbol-determined adjacent signal to the equalization unit.

The compensation value setting unit may set the compensation value to have a denominator obtained by adding a square value of the preset divergence suppression value to a square value of an absolute value of an element included in the diagonal matrix, and a numerator of a complex conjugate of the element included in the diagonal matrix.

The compensation value setting unit may set the preset divergence suppression value to a noise power of a previously obtained useful frequency domain.

The initial estimate value calculation unit may obtain the initial estimate value by multiplying the compensation value from the compensation value setting unit by the FFT-processed signal of the OFDM receiver.

The equalization unit may include: a first calculator obtaining a first interference cancellation compensation value by multiplying the compensation value from the compensation value setting unit by one adjacent signal, which is the symbol-determined pre-equalized signal; a second calculator obtaining a second interference cancellation compensation value by multiplying the compensation value from the compensation value setting unit by another adjacent signal, which is the symbol-determined pre-equalized signal; and a third calculator subtracting the first interference cancellation compensation value and the second interference cancellation compensation value from the initial estimate value, to detect the transmission signal, which is to be processed.

The symbol decision unit may determine respective symbols for both adjacent signals of the transmission signal, which is to be processed among a plurality of signals output from the equalization unit, and provide both symbol-determined adjacent signals to the equalization unit.

According to another aspect of the present invention, there is provided a method of orthogonal frequency division multiplexing (OFDM) channel equalization, including: setting a compensation value in the form of a diagonal matrix by using a diagonal matrix of diagonal elements extracted from a channel matrix of an OFDM receiver, and a preset divergence suppression value, to suppress divergence caused by Jacobi iteration in the channel equalization of the OFDM receiver; calculating an initial estimate value by using a fast Fourier transform (FFT)-processed signal of the OFDM receiver and the compensation value obtained in the setting of the compensation value; performing an equalization operation of obtaining an interference trigger value by using the compensation value obtained in the setting of the compensation value, the channel matrix and the diagonal matrix, multiplying the interference trigger value by a symbol-determined pre-equalized signal to obtain an interference cancellation compensation value, and subtracting the interference cancellation compensation value from the initial estimate value to detect a transmission signal to be processed; and determining a symbol for an adjacent signal of the transmission signal, which is to be processed among a plurality of signals output from the performing of the equalization operation, and providing the symbol-determined adjacent signal to the performing of the equalization operation.

The setting of the compensation value may include setting the compensation value to have a denominator obtained by adding a square value of the preset divergence suppression value to a square value of an absolute value of an element included in the diagonal matrix, and a numerator of a complex conjugate of the element included in the diagonal matrix.

The setting of the compensation value may include setting the preset divergence suppression value to a noise power of a previously obtained useful frequency domain.

The calculating of the initial estimate value may include obtaining the initial estimate value by multiplying the compensation value obtained in the setting of the compensation value by the FFT-processed signal of the OFDM receiver.

The performing of the equalization operation may include: obtaining a first interference cancellation compensation value by multiplying the compensation value obtained in the setting of the compensation value by one adjacent signal, which is the symbol-determined pre-equalized signal; obtaining a second interference cancellation compensation value by multiplying the compensation value obtained in the setting of the compensation value by another adjacent signal, which is the symbol-determined pre-equalized signal; and subtracting the first interference cancellation compensation value and the second interference cancellation compensation value from the initial estimate value to detect the transmission signal which is to be processed.

The determining of the symbol may include determining respective symbols for both adjacent signals of the transmission signal, which is to be processed among a plurality of signals output from the performing of the equalization operation, and providing both symbol-determined adjacent signals to the performing of the equalization operation.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
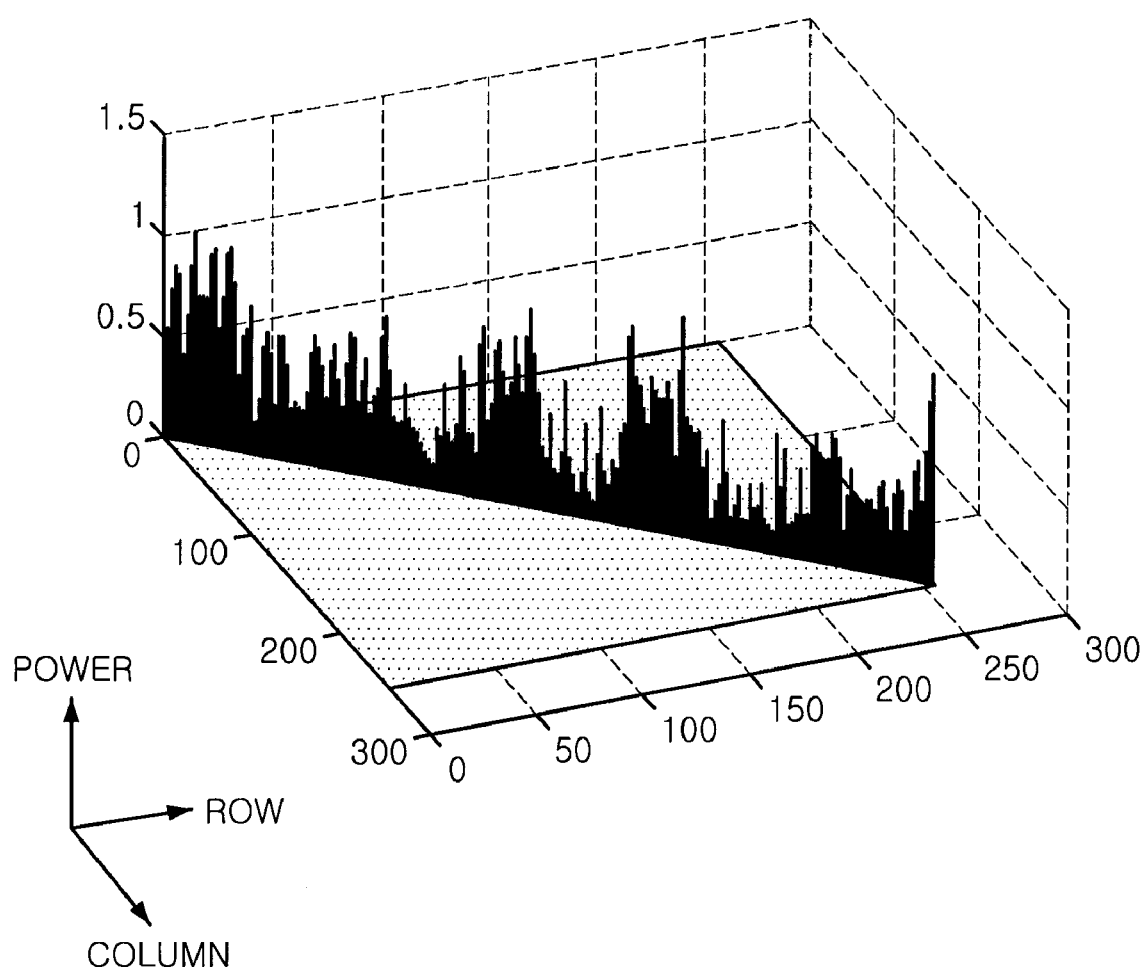
FIG. 1 is a graph depicting the power of a channel matrix in OFDM channel equalization.
Figure 2:
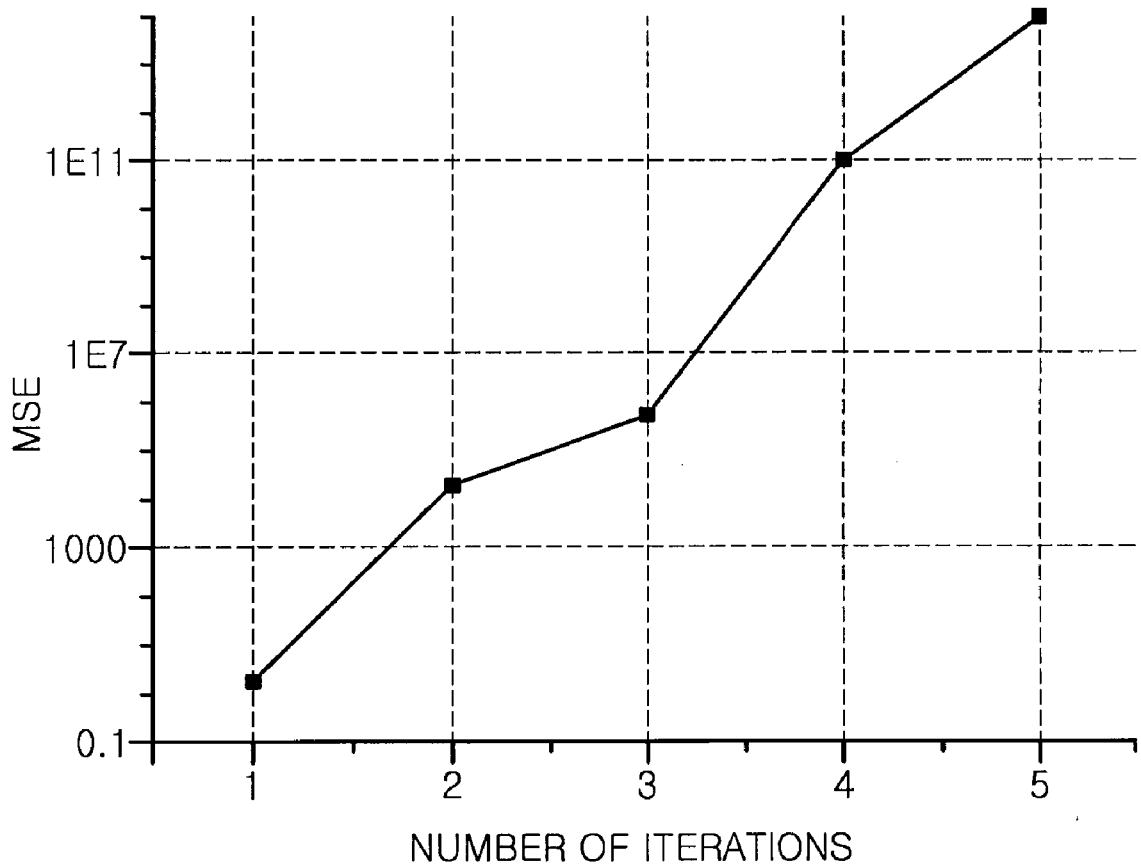
FIG. 2 is a graph depicting mean square error (MSE) performance by a related art OFDM channel equalization method.

Exemplary embodiments of the present invention will now be described in detail with reference to the accompanying drawings.

The invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals in the drawings denote like elements, and thus their description will be omitted.

Figure 3:
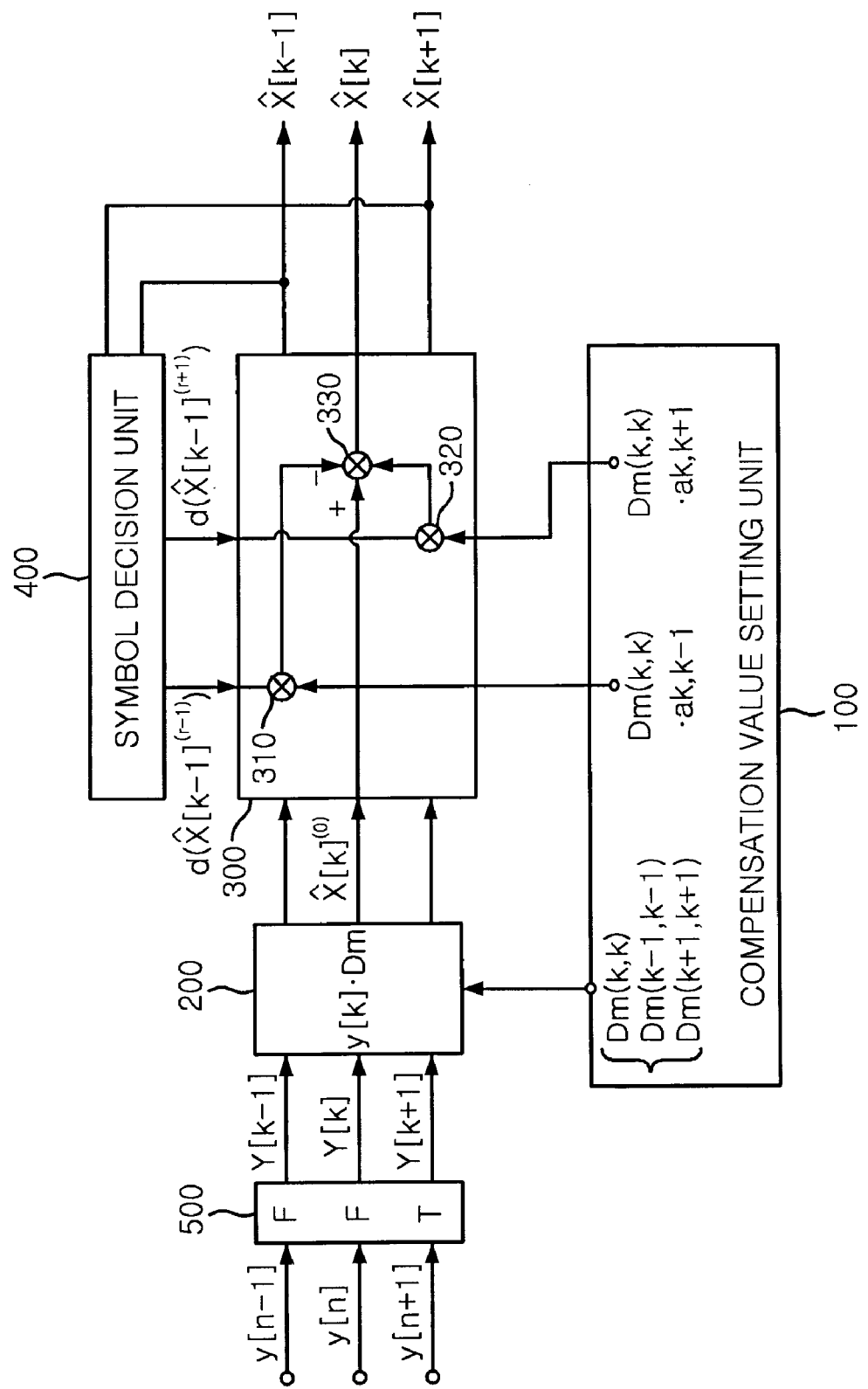
FIG. 3 is a block diagram of an apparatus for OFDM channel equalization according to an exemplary embodiment of the present invention.

FIG. 3 is a block diagram of an apparatus for orthogonal frequency division multiplexing (OFDM) channel equalization according to an exemplary embodiment of the present invention.

Referring to FIG. 3, an apparatus for OFDM channel equalization, according to this embodiment, includes a compensation value setting unit 100, an initial estimate value calculation unit 200, an equalization unit 300, and a symbol decision unit 400. To suppress divergence due to Jacobi iteration during the channel equalization of an OFDM receiver, the compensation value setting unit 100 sets a compensation value (Dm) in the form of a diagonal matrix by using a diagonal matrix (D) of diagonal elements extracted from a channel matrix (H) of the OFDM receiver, and a preset divergence suppression value ($\sigma$). The initial estimate value calculation unit 200 calculates an initial estimate value ($\hat{X}(k)^{(0)}$) by using a fast Fourier transform (FFT)-processed signal (Y(k)) of the OFDM receiver and the compensation value (Dm) from the compensation value setting unit 100. The equalization unit 300 obtains an interference trigger value (Mc) by using the compensation value (Dm) from the compensation value setting unit 100, the channel matrix (H) and the diagonal matrix (D), multiplies the interference trigger value (Mc) by a symbol-determined pre-equalized signal ($d(X^{(r-1)})$) to obtain an interference cancellation compensation value ($V^{(r-1)}$), and subtracts the interference cancellation compensation value ($V^{(r-1)}$) from the initial estimate value ($\hat{X}(k)^{(0)}$), thereby detecting a transmission signal ($X^{(r)}$) to be processed. The symbol decision unit 400 determines respective symbols for adjacent signals ($X(k\pm1)^{(r-1)}$) of a transmission signal ($X(k)^{(r)}$), which is to be processed among a plurality of signals output from the equalization unit 300, and provides the symbol-determined adjacent signals ($d(X(k\pm1)^{(r-1)})$) to the equalization unit 300.

Figure 4:
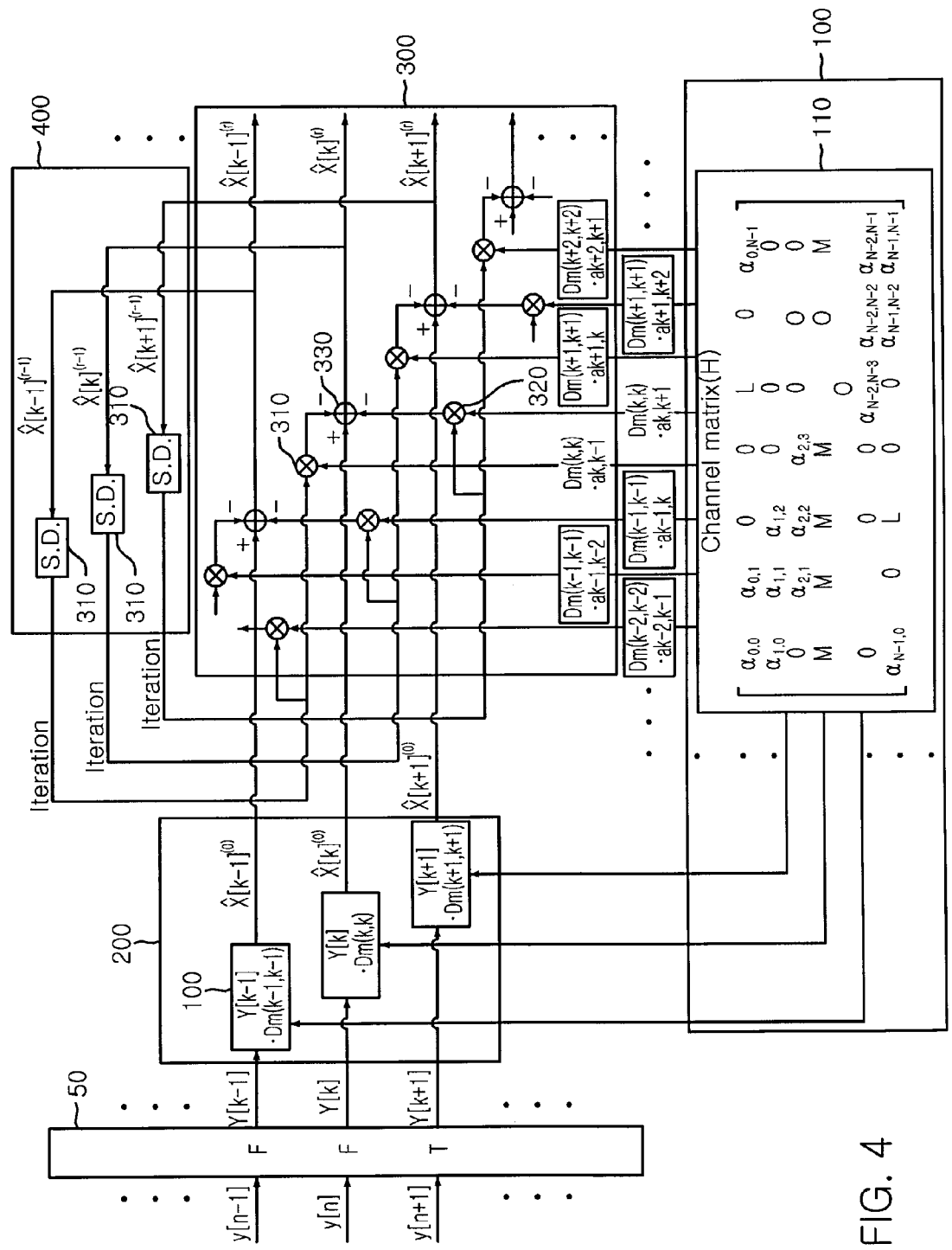
FIG. 4 is a detailed diagram of the apparatus for OFDM channel equalization of FIG. 3.

FIG. 4 is a detailed diagram of the apparatus for OFDM channel equalization of FIG. 3.

Referring to FIGS. 3 and 4, the compensation value setting unit 100 sets the compensation value (Dm) whose denominator is obtained by adding the square value ($\sigma^2$) of the preset divergence suppression value ($\sigma$) to the square value ($|a|^2$) of the absolute value of an element (a) included in the diagonal matrix (D), and numerator is the complex conjugate ($a^*$) of the element (a) included in the diagonal matrix (d).

The compensation value setting unit 100 sets the preset divergence suppression value ($\sigma$) to a noise power of a previously obtained useful frequency domain.

The initial estimate value calculation unit 200 obtains the initial estimate value ($\hat{X}(k)^{(0)}$) by multiplying the compensation value (Dm) from the compensation value setting unit 100 by the FFT-processed signal (Y(k)) of the OFDM receiver.

The equalization unit 300 includes a first calculator 310, a second calculator 320, and a third calculator 330. The first calculator 310 obtains a first interference cancellation compensation value $(V(k-1)^{(r-1)})$ by multiplying the compensation value (Dm) from the compensation value setting unit 100 by one adjacent signal $(d(X(k-1)^{(r-1)}))$ of symbol-determined pre-equalized signals $(d(X(k\pm1)^{(r-1)}))$. The second calculator 320 obtains a second interference cancellation compensation value $(V(k+1)^{(r-1)})$ by multiplying the compensation value (Dm) from the compensation value setting unit 100 by another adjacent signal $(d(X(k+1)^{(r-1)}))$ of the symbol-determined pre-equalized signals $(d(X(k\pm1)^{(r-1)}))$. The third calculator 330 subtracts the first interference cancellation compensation value $(V(k-1)^{(r-1)})$ and the second interference cancellation compensation value $(V(k+1)^{(r-1)})$ from the initial estimate value $(\hat{X}(k)^{(0)})$, thereby detecting the transmission signal $(X(k)^{(r)})$, which is to be processed.

The symbol decision unit 400 determines respective symbols for both adjacent signals $(X(k-1)^{(r-1)}$ and $X(k+1)^{(r-1)})$ of the transmission signal $(X(k)^{(r)})$, which is to be processed among a plurality of signals output from the equalization unit 300, and provides both symbol-determined adjacent signals $(d(X(k-1)^{(r-1)})$ and $d(X(k+1)^{(r-1)}))$ to the equalization unit 300.

Figure 5:
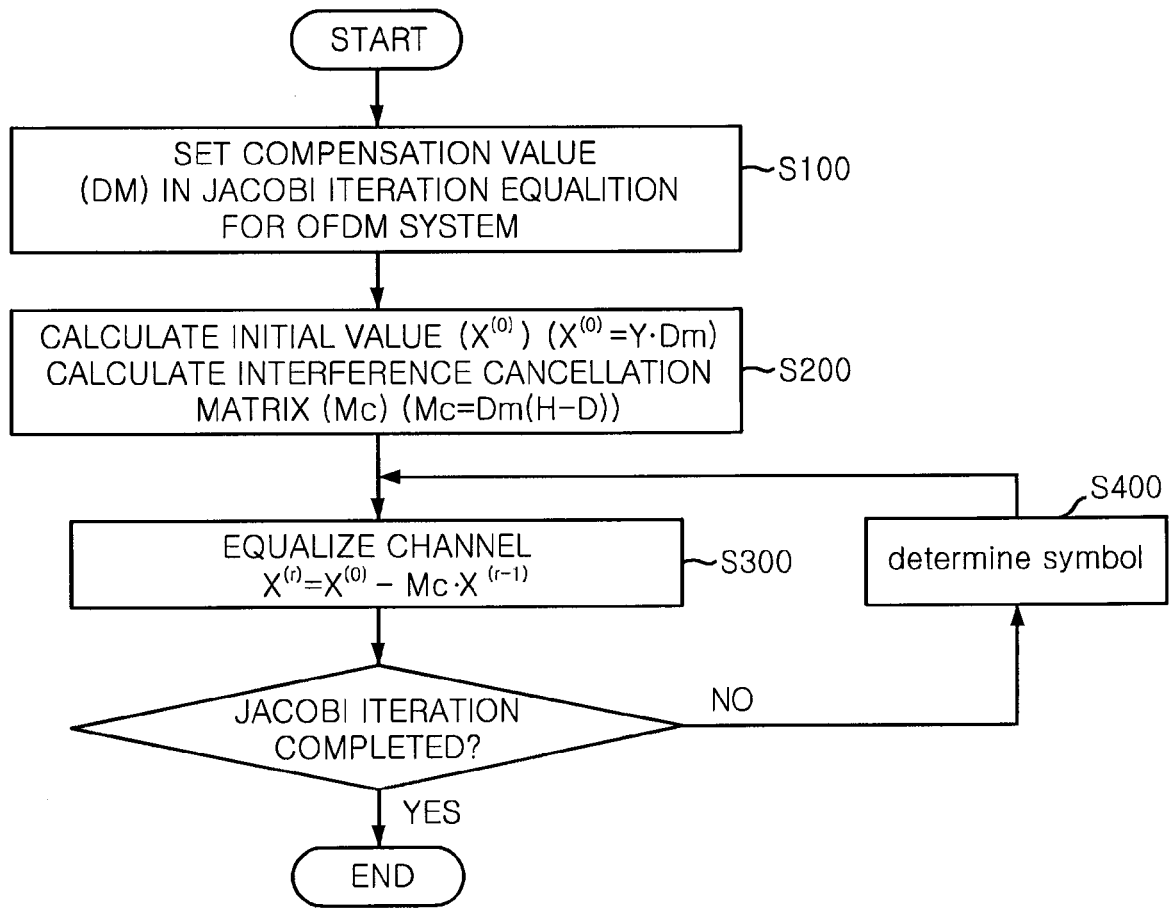
FIG. 5 is a flowchart of a method for OFDM channel equalization according to an exemplary embodiment of the present invention.

FIG. 5 is a flowchart of a method for OFDM channel equalization according to an exemplary embodiment of the present invention.

Referring to FIG. 5, to suppress divergence due to Jacobi iteration during the channel equalization of an OFDM receiver, the method for OFDM channel equalization according to this embodiment includes a compensation value setting operation S100, an initial estimate value calculation operation S200, an equalization operation S300, and a symbol decision operation S400. In the compensation-value setting operation S100, a compensation value (Dm) in the form of a diagonal matrix is set by using a preset divergence suppression value ($\sigma$) and a diagonal matrix (D) of diagonal elements extracted from the channel matrix (H) of the OFDM receiver. In the initial estimate value calculation operation S200, the initial estimate value $(\hat{X}(k)^{(0)})$ is calculated by using an FFT-processed signal (Y(k)) of the OFDM receiver and the compensation value (Dm) from the compensation value setting operation S100. In the equalization operation S300, an interference trigger value (Mc) is obtained by using the compensation value (Dm) from the compensation value setting operation S100, the channel matrix (H) and the diagonal matrix (D), the interference trigger value (Mc) is multiplied by a symbol-determined pre-equalized signal $(d(X^{(r-1)}))$ to obtain an interference cancellation compensation value $(V^{(r-1)})$, and the interference cancellation compensation value $(V^{(r-1)})$ is subtracted from the initial estimate value $(\hat{X}(k)^{(0)})$, thereby detecting a transmission signal $(X^{(r)})$ to be processed. In the symbol decision operation S400, respective symbols for adjacent signals $(X(k\pm1)^{(r-1)})$ of a transmission signal $(X(k)^{(r)})$, which is to be processed among a plurality of signals output from the equalization operation S300, are determined, and the symbol-determined adjacent signals $(d(X(k\pm1)^{(r-1)}))$ are provided to the equalization operation S300.

In the compensation value setting operation S100, the compensation value (Dm) is set to have a denominator obtained by adding the square value ($\sigma^2$) of the preset divergence suppression value ($\sigma$) to the square value ($|a|^2$) of the absolute value of an element (a) included in the diagonal matrix (D), and a numerator of the complex conjugate (a*) of the element (a) included in the diagonal matrix (D).

In the compensation value setting operation S100, the preset divergence suppression value ($\sigma$) is set to a noise power of a previously obtained useful frequency domain.

In the initial estimate value calculation operation S200, the compensation value (Dm) from the compensation value setting operation S100 is multiplied by the FFT-processed signal (Y(k)) of the OFDM receiver, thereby obtaining the initial estimate value $(\hat{X}(k)^{(0)})$.

Figure 6:
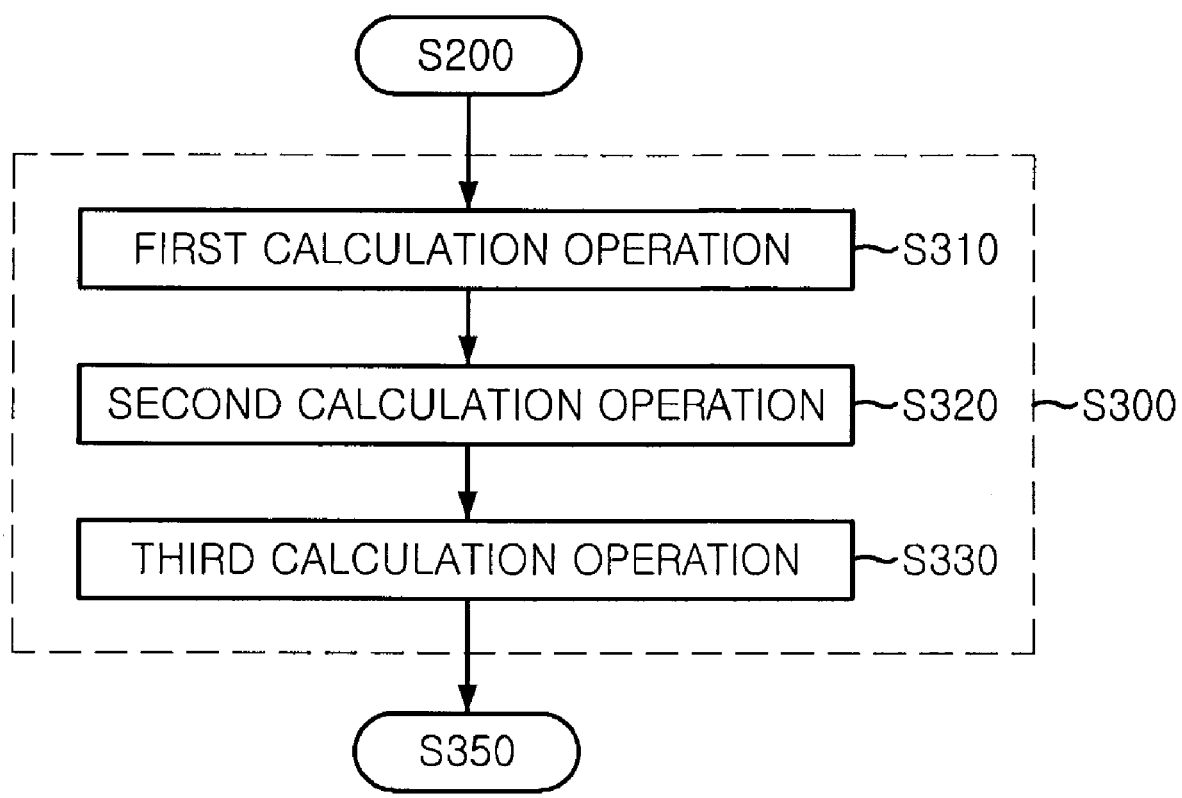
FIG. 6 is a detailed flowchart of an equalization operation according to an exemplary embodiment of the present invention.

FIG. 6 is a detailed flowchart of the equalization operation according to an exemplary embodiment of the present invention.

Referring to FIGS. 5 and 6, the equalization operation S300 includes a first calculation operation S310, a second calculation operation S320 and a third calculation operation S330. In the first calculation operation S310, the compensation value (Dm) from the compensation value setting operation S100 is multiplied by one adjacent signal $(d(X(k-1)^{(r-1)}))$ of symbol-determined pre-equalized signals $(d(X(k\pm1)^{(r-1)}))$, thereby obtaining a first interference cancellation compensation value $(V(k-1)^{(r-1)})$. In the second calculation operation S320, the compensation value Dm from the compensation value setting operation S100 is multiplied by another adjacent signal $(d(X(k+1)^{(r-1)}))$ of the symbol-determined pre-equalized signals $(d(X(k+1)^{(r-1)}))$, thereby obtaining a second interference cancellation compensation value $(V(k+1)^{(r-1)})$. In the third calculation operation S330, the first interference cancellation compensation value $(V(k-1)^{(r-1)})$ and the second interference cancellation compensation value $(V(k+1)^{(r-1)})$ are subtracted from the initial estimate value $(\hat{X}(k)^{(0)})$, thus detecting the transmission signal $(X(k)^{(r)})$ which is to be processed.

In the symbol decision operation S400, respective symbols for both adjacent signals $(X(k-1)^{(r-1)}$ and $X(k+1)^{(r-1)})$ of the transmission signal $(X(k)^{(r)})$, which is to be processed among a plurality of signals output from the equalization unit 300, are determined, and both symbol-determined adjacent signals $(d(X(k-1)^{(r-1)})$ and $d(X(k+1)^{(r-1)}))$ are provided to the equalization operation S300.

Figure 7:
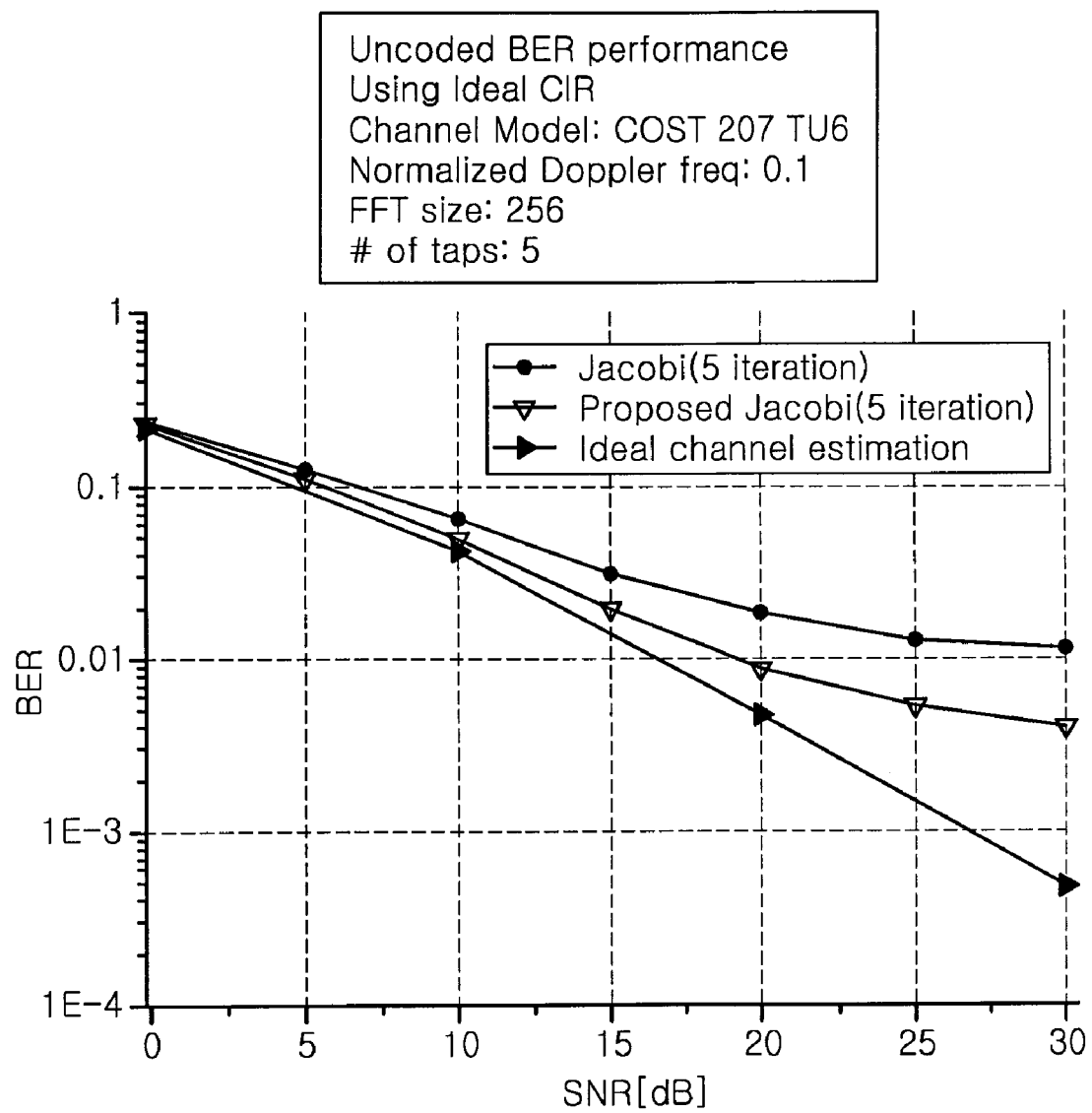
FIG. 7 is a graph depicting bit error rate (BER) performance by OFDM channel equalization according to an exemplary embodiment of the present invention.

FIG. 7 is a graph depicting BER performance by OFDM channel equalization according to the present invention. In FIG. 7, the FFT size is 256, the Doppler frequency is 0.1, and the channel model is 'COST 207 TU6'. For performance comparison, the graph of FIG. 7 shows the result of the related art, the result of the present invention, and the result of an ideal channel estimation.

Figure 8:
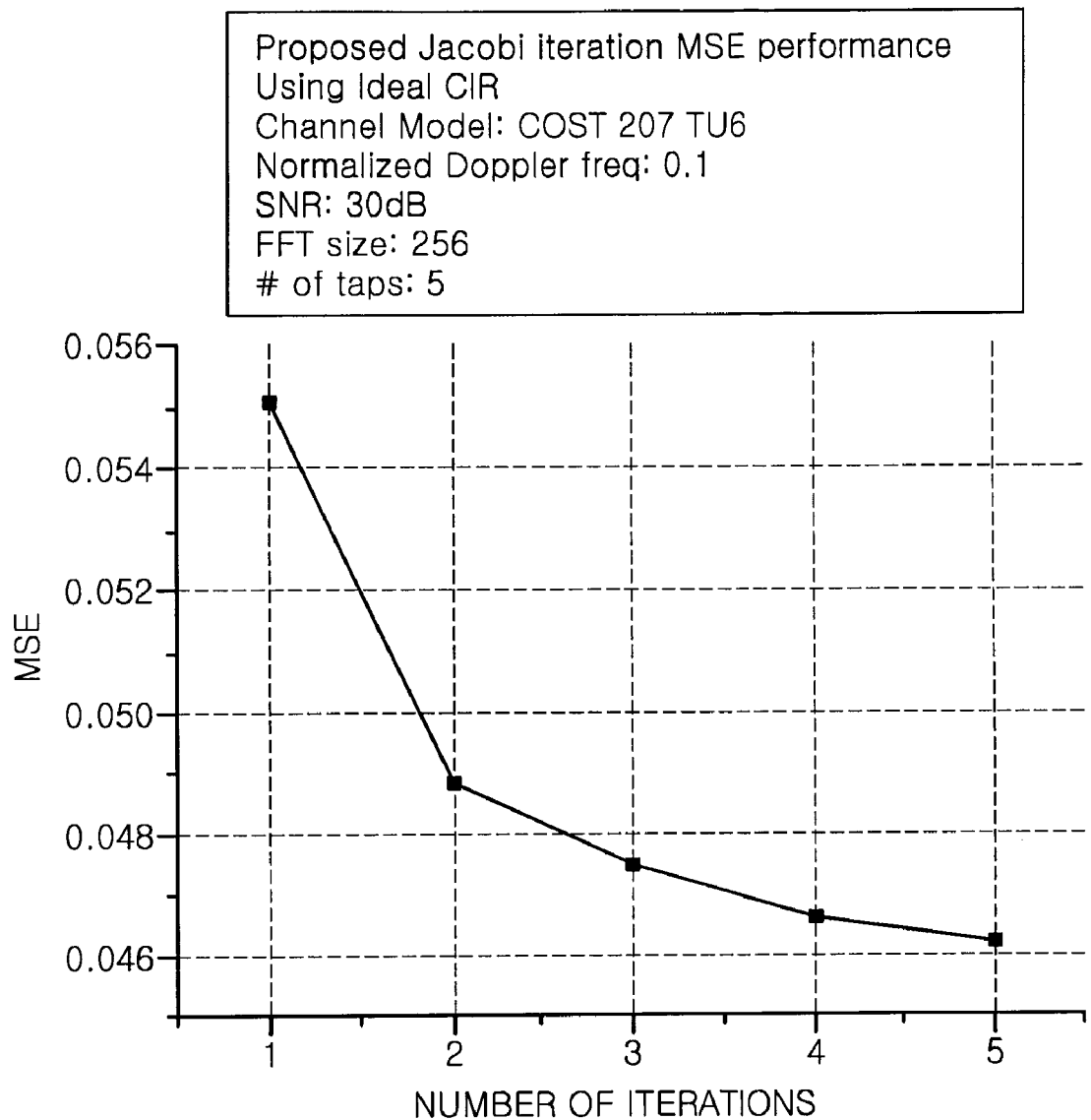
FIG. 8 is a graph depicting mean square error (MSE) performance by OFDM channel equalization according to an exemplary embodiment of the present invention.

FIG. 8 is a graph depicting MSE performance by OFDM channel equalization according to an exemplary embodiment of the present invention. It can be seen from FIG. 8 that MSE performance is improved with an increase in the number of iterations.

Hereinafter, the operation and effect of the present invention will be described in detail with reference to accompanying drawings.

First, an apparatus for OFDM channel equalization according to an exemplary embodiment of the present invention will now be described with reference to FIGS. 3 and 4.

In FIG. 3, the apparatus for OFDM channel equalization according to this embodiment includes the compensation value setting unit 100, the initial estimate value calculation unit 200, the equalization unit 300 and the symbol decision unit 400.

To suppress divergence due to Jacobi iterations during the channel equalization of an OFDM receiver, the compensation value setting unit 100 sets a compensation value (Dm) in the form of a diagonal matrix by using a diagonal matrix (D) of diagonal elements extracted from a channel matrix (H) of the OFDM receiver, and a preset divergence suppression value ($\sigma$).

The initial estimate value calculation unit 200 multiplies the compensation value (Dm) from the compensation value setting unit 100 by an FFT-processed signal (Y(k)) of the OFDM receiver, thereby obtaining the initial estimate value ($\hat{X}(k)^{(0)}$).

The equalization unit 300 obtains an interference trigger value (Mc) by using the compensation value (Dm) from the compensation value setting unit 100, the channel matrix (H) and the diagonal matrix (D), multiplies the interference trigger value (Mc) by a symbol-determined pre-equalized signal ($d(X^{(r-1)})$) to obtain an interference cancellation compensation value ($V^{(r-1)}$), and subtracts the interference cancellation compensation value ($V^{(r-1)}$) from the initial estimate value ($\hat{X}(k)^{(0)}$), thereby detecting a transmission signal ($X^{(r)}$) to be processed.

The interference trigger value (Mc), the interference cancellation compensation value ($V^{(r-1)}$) and the transmission signal ($X^{(r)}$) to be processed may be expressed by Equation 9 below:

$$Mc = Dm(H-D)$$

$$V^{(r-1)} = Mc \cdot d(X^{(r-1)})$$

$$X^{(r)} = \hat{X}(k)^{(0)} - V^{(r-1)} = \hat{X}(k)^{(0)} - Mc \cdot d(X^{(r-1)}) \quad (9)$$

The symbol decision unit 400 determines respective symbols for the adjacent signals ($X(k\pm1)^{(r-1)}$) of a transmission signal ($X(k)^{(r)}$), which is to be processed among a plurality of signals output from the equalization unit 300, and provides the symbol-determined adjacent signals ($d(X(k\pm1)^{(r-1)})$) to the equalization unit 300.

Referring to FIGS. 3 and 4, the compensation value setting unit 100 sets the compensation value (Dm) whose denominator is obtained by adding the square value ($\sigma^2$) of the preset divergence suppression value ($\sigma$) to the square value ($|a|^2$) of the absolute value of an element (a) included in the diagonal matrix (D), and numerator is the complex conjugate (a*) of the element (a) included in the diagonal matrix (D).

The compensation value (Dm) may be represented by Equation 10 below, and '*' denotes a complex conjugate.

$$D_m = \frac{D^*}{|D|^2 + \sigma^2},$$

$$D_m(k,k) = \frac{a_{k,k}^*}{|a_{k,k}^2 + \sigma^2|} \quad (10)$$

The compensation value setting unit 100 sets the preset divergence suppression value ($\sigma$) to a noise power of a previously obtained useful frequency domain.

The initial estimate value calculation unit 200 multiplies the compensation value (Dm) from the compensation value setting unit 100 by the FFT-processed signal (Y(k)) of the OFDM receiver, thereby obtaining the initial estimate value ($\hat{X}(k)^{(0)}$).

For example, as for three taps 'k−1', 'k' and 'k+1' of the FFT, one initial estimate value ($\hat{X}(k)^{(0)}$) and both adjacent initial estimate value ($\hat{X}(k-1)^{(0)}$ and $\hat{X}(k+1)^{(0)}$) thereof may be represented by Equation 11 below:

$$\hat{X}(k-1)^{(0)} = Y[k-1] \cdot Dm(k-1,k-1)$$

$$\hat{X}(k)^{(0)} = Y[k] \cdot Dm(k,k)$$

$$\hat{X}(k+1)^{(0)} = Y[k+1] \cdot Dm(k+1,K+1) \quad (11)$$

If the diagonal matrix (D) including diagonal elements extracted from the channel matrix (H) is represented as in Equation 6 below, the compensation value (Dm) in the form of a diagonal matrix may be represented by Equation 12 below:

$$Dm = \begin{bmatrix} Dm(0,0) & 0 & . & . & . & 0 \\ 0 & Dm(1,1) & . & . & . & 0 \\ . & . & & & & . \\ . & . & & Dm(k,k) & & . \\ . & . & & & & . \\ 0 & 0 & . & . & . & Dm(N-1,N-1) \end{bmatrix} \quad (12)$$

The symbol decision unit 400 determines respective symbols for both adjacent signals ($X(k-1)^{(r-1)}$ and $X(k+1)^{(r-1)}$) of a transmission signal ($X(k)^{(r)}$) which is to be processed among a plurality of signals output from the equalization unit 300, and provides both symbol-determined adjacent signals ($d(X(k-1)^{(r-1)})$ and $d(X(k+1)^{(r-1)})$) to the equalization unit 300.

For example, in the case of quadrature phase-shift keying (QPSK), a symbol determination with respect to a complex number 'A' may be performed as represented in Equation 13 below, and in the case of 16-quadrature amplitude modulation (16QAM), a symbol determination with respect to a complex number 'A' may be performed as represented in Equation 14 below:

$$A = A1 + j \cdot A2 \quad (13)$$
$$\text{decision}[A] = \text{decision}[A1] + j \cdot \text{decision}[A2]$$

$$\text{decision}[A1] = \begin{cases} \frac{-1}{\sqrt{2}} & \text{if } A1 < 0 \\ \frac{1}{\sqrt{2}} & \text{if } A1 > 0 \end{cases}$$

$$\text{decision}[A2] = \begin{cases} \frac{-1}{\sqrt{2}} & \text{if } A2 < 0 \\ \frac{1}{\sqrt{2}} & \text{if } A2 > 0 \end{cases}$$

$$A = A1 + j \cdot A2 \quad (14)$$
$$\text{decision}[A] = \text{decision}[A1] + j \cdot \text{decision}[A2]$$

$$\text{decision}[A1] = \begin{cases} \frac{-3}{\sqrt{10}} & \text{if } A1 < \frac{-2}{\sqrt{10}} \\ \frac{-1}{\sqrt{10}} & \text{if } \frac{-2}{\sqrt{10}} < A1 < 0 \\ \frac{1}{\sqrt{10}} & \text{if } 0 < A1 < \frac{2}{\sqrt{10}} \\ \frac{3}{\sqrt{10}} & \text{if } \frac{2}{\sqrt{10}} < A1 \end{cases}$$

$$\text{decision}[A2] = \begin{cases} \frac{-3}{\sqrt{10}} & \text{if } A2 < \frac{-2}{\sqrt{10}} \\ \frac{-1}{\sqrt{10}} & \text{if } \frac{-2}{\sqrt{10}} < A2 < 0 \\ \frac{1}{\sqrt{10}} & \text{if } 0 < A2 < \frac{2}{\sqrt{10}} \\ \frac{3}{\sqrt{10}} & \text{if } \frac{2}{\sqrt{10}} < A2 \end{cases}$$

The equalization unit 300 will now be described with reference to FIGS. 3 and 4.

When including the first calculator 310, the second calculator 320 and the third calculator 330, the equalization unit 300 removes influences of interference by using both adjacent signals, with respect to an arbitrary initial estimate value ($\hat{X}(k)^{(0)}$) among a plurality of FFT-processed signals, thereby detecting a transmission signal ($X^{(r)}$) to be processed.

In more detail, the first calculator 310 obtains a first interference cancellation compensation value ($V(k-1)^{(r-1)}$) by multiplying the compensation value (Dm) from the compensation value setting unit 100 by one adjacent signal ($d(X(k-1)^{(r-1)})$) of the symbol-determined adjacent signals ($d(X(k+1)^{(r-1)})$).

The second calculator 320 obtains a second interference cancellation compensation value ($V(k+1)^{(r-1)}$) by multiplying the compensation value (Dm) from the compensation value setting unit 100 by another adjacent signal ($d(X(k+1)^{(r-1)})$) of the symbol-determined equalized signals ($d(X(k+1)^{(r-1)})$).

The third calculator 330 detects the transmission signal ($X(k)^{(r)}$) to be processed, by subtracting the first interference cancellation compensation value ($V(k-1)^{(r-1)}$) and the second interference cancellation compensation value ($V(k+1)^{(r-1)}$) from the initial estimate value ($\hat{X}(k)^{(0)}$).

The method for OFDM channel equalization will now be described with reference to FIGS. 3 through 6.

In FIG. 5, the method for OFDM channel equalization according to an exemplary embodiment of the present invention includes the compensation value setting operation S100, the initial estimate value calculation operation S200, the equalization operation S300, and the symbol decision operation S400.

Referring to FIGS. 3 through 6, to suppress divergence due to Jacobi iterations during the channel equalization of an OFDM receiver, a compensation value (Dm) in the form of a diagonal matrix is set by using a diagonal matrix (D) of diagonal elements extracted from a channel matrix (H) of the OFDM receiver, and a preset divergence suppression value ($\sigma$) in the compensation value setting operation S100.

In the initial estimate value calculation operation S200, an initial estimate value ($\hat{X}(k)^{(0)}$) is calculated by using the compensation value (Dm) from the compensation value setting operation S100 and an FFT-processed signal (Y(k)) of the OFDM receiver.

In the equalization operation S300, an interference trigger value (Mc) is obtained by using the compensation value (Dm) from the compensation value setting operation S100, the channel matrix (H) and the diagonal matrix, the interference trigger value (Mc) is multiplied by a symbol-determined pre-equalized signal ($d(X^{(r-1)})$) to obtain an interference cancellation compensation value ($V^{(r-1)}$), and the interference cancellation compensation value ($V^{(r-1)}$) is subtracted from the initial estimate value ($\hat{X}(k)^{(0)}$), thereby a detecting transmission signal ($X^{(r)}$)) to be processed (see Equation 9 above).

In the symbol decision operation S400, respective symbols for the adjacent signals ($X(k\pm1)^{(r-1)}$) of a transmission signal ($X(k)^{(r)}$), which is to be processed among a plurality of signals output from the equalization operation S400, are determined, and the symbol-determined adjacent signals ($d(X(k\pm1)^{(r-1)})$) are provided to the equalization operation S300.

In the compensation value setting operation S100, the compensation value (Dm) is set to have a denominator obtained by adding the square value ($\sigma^2$) of the preset divergence suppression value ($\sigma$) to the square value ($|a|^2$) of the absolute value of an element (a) included in the diagonal matrix (D), and a numerator of the complex conjugate (a*) of the element (a) included in the diagonal matrix (D). (see Equations 10 and 12 above).

In the compensation value setting operation S100, the preset divergence suppression value ($\sigma$) is set to a noise power of a previously obtained useful frequency domain.

In the initial estimate value calculation operation S200, the compensation value (Dm) from the compensation value setting unit 100 is multiplied by the FFT-processed signal (Y(k)) of the OFDM receiver, thereby obtaining the initial estimate value ($\hat{X}(k)^{(0)}$) (see Equation 11 above).

Referring to FIGS. 5 and 6, the equalization operation S300 may include a first calculation operation S310, a second calculation operation S320, and a third calculation operation S330.

In the first calculation operation S310, the compensation value (Dm) from the compensation value setting operation S100 is multiplied by one adjacent signal ($d(X(k-1)^{(r-1)})$) of symbol-determined pre-equalized signals ($d(X(k\pm1)^{(r-1)})$), thereby obtaining a first interference cancellation compensation value ($V(k-1)^{(r-1)}$).

In the second calculation operation S320, the compensation value (Dm) from the compensation value setting operation S100 is multiplied by another adjacent signal ($d(X(k+1)^{(r-1)})$) of the symbol-determined pre-equalized signals ($d(X(k\pm1)^{(r-1)})$), thereby obtaining a second interference cancellation compensation value ($V(k+1)^{(r-1)}$).

In the third calculation operation S330, the first interference cancellation compensation value ($V(k-1)^{(r-1)}$) and the second interference cancellation compensation value ($V(k+1)^{(r-1)}$) are subtracted from the initial estimate value ($\hat{X}(k)^{(0)}$), thus detecting the transmission signal ($X(k)^{(r)}$) which is to be processed.

In the symbol decision operation S400, respective symbols for both adjacent signals ($X(k-1)^{(r-1)}$ and $X(k+1)^{(r-1)}$) of the transmission signal ($X(k)^{(r)}$), which is to be processed among a plurality of signals output from the equalization unit 300, are determined, and both symbol-determined adjacent signals ($d(X(k-1)^{(r-1)})$ and $d(X(k+1)^{(r-1)})$) are provided to the equalization process S300.

Referring to FIG. 7, the FFT size is 256, the Doppler frequency is 0.1, and the channel model is 'COST 207 TU6'. It can be seen from the graph of FIG. 7 depicting the result of the related art, the result of the present invention, and the result of the ideal channel estimation, that the bit error rate (BER) of the present invention is improved as compared to the related art.

It can be seen from FIG. 8 that MSE performance is improved with an increase in the number of iterations. The iteration may be performed three times because an operation of more than three iterations has an insignificant effect on improving MSE performance.

As set forth above, according to exemplary embodiments of the invention, divergence can be prevented, the convergence rate can be increased, and MSE performance can be enhanced in the Jacobi iteration equation applied to an OFDM system in fast time-varying fading channel environments.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for orthogonal frequency division multiplexing (OFDM) channel equalization, comprising:
a compensation value setting unit setting a compensation value in the form of a diagonal matrix by using a diagonal matrix of diagonal elements extracted from a channel matrix of an OFDM receiver, and a preset divergence suppression value, to suppress divergence caused by Jacobi iteration in the channel equalization of the OFDM receiver;

an initial estimate value calculation unit calculating an initial estimate value by using a fast Fourier transform (FFT)-processed signal of the OFDM receiver and the compensation value from the compensation value setting unit;

an equalization unit obtaining an interference trigger value by using the compensation value from the compensation value setting unit, the channel matrix and the diagonal matrix, multiplying the interference trigger value by a symbol-determined pre-equalized signal to obtain an interference cancellation compensation value, and subtracting the interference cancellation compensation value from the initial estimate value to detect a transmission signal to be processed; and a symbol decision unit determining a symbol for an adjacent signal of a transmission signal, which is to be processed among a plurality of signals output from the equalization unit, and providing the symbol-determined adjacent signal to the equalization unit.

2. The apparatus of claim 1, wherein the compensation value setting unit sets the compensation value to have a denominator obtained by adding a square value of the preset divergence suppression value to a square value of an absolute value of an element included in the diagonal matrix, and a numerator of a complex conjugate of the element included in the diagonal matrix.

3. The apparatus of claim 2, wherein the compensation value setting unit sets the preset divergence suppression value to a noise power of a previously obtained useful frequency domain.

4. The apparatus of claim 3, wherein the initial estimate value calculation unit obtains the initial estimate value by multiplying the compensation value from the compensation value setting unit by the FFT-processed signal of the OFDM receiver.

5. The apparatus of claim 4, wherein the equalization unit comprises:

a first calculator obtaining a first interference cancellation compensation value by multiplying the compensation value from the compensation value setting unit by one adjacent signal, which is the symbol-determined pre-equalized signal;

a second calculator obtaining a second interference cancellation compensation value by multiplying the compensation value from the compensation value setting unit by another adjacent signal, which is the symbol-determined pre-equalized signal; and a third calculator subtracting the first interference cancellation compensation value and the second interference cancellation compensation value from the initial estimate value, to detect the transmission signal, which is to be processed.

6. The apparatus of claim 5, wherein the symbol decision unit determines respective symbols for both adjacent signals of the transmission signal, which is to be processed among a plurality of signals output from the equalization unit, and provides both symbol-determined adjacent signals to the equalization unit.

7. A method of orthogonal frequency division multiplexing (OFDM) channel equalization, the method comprising:

setting a compensation value in the form of a diagonal matrix by using a diagonal matrix of diagonal elements extracted from a channel matrix of an OFDM receiver, and a preset divergence suppression value, to suppress divergence caused by Jacobi iteration in the channel equalization of the OFDM receiver;

calculating an initial estimate value by using a fast Fourier transform (FFT)-processed signal of the OFDM receiver and the compensation value obtained in the setting of the compensation value;

performing an equalization operation of obtaining an interference trigger value by using the compensation value obtained in the setting of the compensation value, the channel matrix and the diagonal matrix, multiplying the interference trigger value by a symbol-determined pre-equalized signal to obtain an interference cancellation compensation value, and subtracting the interference cancellation compensation value from the initial estimate value to detect a transmission signal to be processed; and determining a symbol for an adjacent signal of the transmission signal, which is to be processed among a plurality of signals output from the performing of the equalization operation, and providing the symbol-determined adjacent signal to the performing of the equalization operation.

8. The method of claim 7, wherein the setting of the compensation value comprises setting the compensation value to have a denominator obtained by adding a square value of the preset divergence suppression value to a square value of an absolute value of an element included in the diagonal matrix, and a numerator of a complex conjugate of the element included in the diagonal matrix.

9. The method of claim 8, wherein the setting of the compensation value comprises setting the preset divergence suppression value to a noise power of a previously obtained useful frequency domain.

10. The method of claim 9, wherein the calculating of the initial estimate value comprises obtaining the initial estimate value by multiplying the compensation value obtained in the setting of the compensation value by the FFT-processed signal of the OFDM receiver.

11. The method of claim 10, wherein the performing of the equalization operation comprises:

obtaining a first interference cancellation compensation value by multiplying the compensation value obtained in the setting of the compensation value by one adjacent signal, which is the symbol-determined pre-equalized signal;

obtaining a second interference cancellation compensation value by multiplying the compensation value obtained in the setting of the compensation value by another adjacent signal, which is the symbol-determined pre-equalized signal; and subtracting the first interference cancellation compensation value and the second interference cancellation compensation value from the initial estimate value to detect the transmission signal which is to be processed.

12. The method of claim 11, wherein the determining of the symbol comprises determining respective symbols for both adjacent signals of the transmission signal, which is to be processed among a plurality of signals output from the performing of the equalization operation, and providing both symbol-determined adjacent signals to the performing of the equalization operation.

* * * * *